(12) United States Patent
Dobrowski et al.

(10) Patent No.: US 7,600,234 B2
(45) Date of Patent: Oct. 6, 2009

(54) METHOD FOR LAUNCHING APPLICATIONS

(75) Inventors: Patrick M. Dobrowski, Burnsville, MN (US); Scott N. Hokeness, Lakeville, MN (US); Fred G. Middendorf, Eagan, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1233 days.

(21) Appl. No.: 10/315,857

(22) Filed: Dec. 10, 2002

(65) Prior Publication Data

US 2004/0111499 A1 Jun. 10, 2004

(51) Int. Cl.
*G06F 9/54* (2006.01)
*G06F 19/00* (2006.01)

(52) U.S. Cl. ............................ 719/330; 700/97; 719/328

(58) Field of Classification Search ...................... 703/7, 703/9, 11, 12; 715/755; 700/19, 28, 83, 700/97; 719/328, 330
See application file for complete search history.

(56) References Cited

U.S. PATENT DOCUMENTS

| | | | |
|---|---|---|---|
| 4,527,271 A | 7/1985 | Hallee et al. | |
| 4,607,325 A | 8/1986 | Horn | |
| 4,657,179 A | 4/1987 | Aggers et al. | |
| 4,734,873 A | 3/1988 | Malloy et al. | |
| 4,763,243 A | 8/1988 | Barlow et al. | |
| 4,764,862 A | 8/1988 | Barlow et al. | |
| 4,885,694 A | 12/1989 | Pray et al. | |
| 4,907,167 A | 3/1990 | Skeirik | |
| 4,910,691 A | 3/1990 | Skeirik | |
| 4,944,035 A | 7/1990 | Aagardl et al. | |
| 4,956,793 A | 9/1990 | Bonne et al. | |
| 4,965,742 A | 10/1990 | Skeirik | |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,863 A | 8/1991 | Bristol et al. | |
| 5,050,095 A | 9/1991 | Samad | |
| 5,070,458 A | 12/1991 | Gilmore et al. | |
| 5,121,467 A | 6/1992 | Skeirik | |

(Continued)

FOREIGN PATENT DOCUMENTS

EP     0 780 756     6/1997

(Continued)

OTHER PUBLICATIONS

International Search Report for PCT/US03/39041 dated Nov. 16, 2005.

(Continued)

*Primary Examiner*—Li B Zhen
*Assistant Examiner*—Abdou K Seye
(74) *Attorney, Agent, or Firm*—Marshall, Gerstein & Borun LLP

(57) ABSTRACT

An originating application in a process plant is able to launch multiple desired applications, with one or more of the desired applications having a different application programming interface. In one example, the originating application is able to launch multiple desired applications via an application launcher program. The originating application provides the application launcher program with an indication of the desired application to be launched, and the application launcher program then launches the indicated desired application.

40 Claims, 10 Drawing Sheets

U.S. PATENT DOCUMENTS

| | | | |
|---|---|---|---|
| 5,134,574 A | 7/1992 | Beaverstock et al. | |
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,193,143 A | 3/1993 | Kaemmerer et al. | |
| 5,197,114 A | 3/1993 | Skeirik | |
| 5,212,765 A | 5/1993 | Skeirik | |
| 5,224,203 A | 6/1993 | Skeirik | |
| 5,282,261 A | 1/1994 | Skeirik | |
| 5,291,190 A | 3/1994 | Scarola et al. | |
| 5,301,101 A | 4/1994 | MacArthur et al. | |
| 5,311,447 A | 5/1994 | Bonne | |
| 5,333,298 A | 7/1994 | Bland et al. | |
| 5,351,184 A | 9/1994 | Lu et al. | |
| 5,353,207 A | 10/1994 | Keeler et al. | |
| 5,369,599 A | 11/1994 | Sadjadi et al. | |
| 5,373,452 A | 12/1994 | Guha | |
| 5,384,698 A | 1/1995 | Jelinek | |
| 5,390,326 A | 2/1995 | Shah | |
| 5,396,415 A | 3/1995 | Konar et al. | |
| 5,398,303 A | 3/1995 | Tanaka | |
| 5,408,406 A | 4/1995 | Mathur et al. | |
| 5,442,544 A | 8/1995 | Jelinek | |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,537,310 A | 7/1996 | Tanake et al. | |
| 5,541,833 A | 7/1996 | Bristol et al. | |
| 5,546,301 A | 8/1996 | Agrawal et al. | |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,572,420 A | 11/1996 | Lu | |
| 5,574,638 A | 11/1996 | Lu | |
| 5,596,704 A | 1/1997 | Geddes et al. | |
| 5,640,491 A | 6/1997 | Bhat et al. | |
| 5,666,297 A | 9/1997 | Britt et al. | |
| 5,687,090 A | 11/1997 | Chen et al. | |
| 5,692,129 A | 11/1997 | Sonderegger et al. | |
| 5,692,158 A | 11/1997 | Degeneff et al. | |
| 5,704,011 A | 12/1997 | Hansen et al. | |
| 5,715,158 A | 2/1998 | Chen | |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,761,518 A | 6/1998 | Boehling et al. | |
| 5,777,872 A | 7/1998 | He | |
| 5,781,432 A | 7/1998 | Keeler et al. | |
| 5,790,898 A | 8/1998 | Kishima et al. | |
| 5,796,609 A | 8/1998 | Tao et al. | |
| 5,798,939 A | 8/1998 | Ochoa et al. | |
| 5,809,490 A | 9/1998 | Guiver et al. | |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,842,189 A | 11/1998 | Keeler et al. | |
| 5,847,952 A | 12/1998 | Samad | |
| 5,859,773 A | 1/1999 | Keeler et al. | |
| 5,859,978 A | 1/1999 | Sonderegger et al. | |
| 5,877,954 A | 3/1999 | Klimasauskas et al. | |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,903,455 A | 5/1999 | Sharpe, Jr. et al. | |
| 5,905,989 A | 5/1999 | Biggs | |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,917,840 A | 6/1999 | Cheney et al. | |
| 5,918,233 A | 6/1999 | La Chance et al. | |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,960,214 A | 9/1999 | Sharpe, Jr. et al. | |
| 5,960,441 A | 9/1999 | Bland et al. | |
| 5,984,502 A | 11/1999 | Calder | |
| 5,988,847 A | 11/1999 | McLaughlin et al. | |
| 6,008,985 A | 12/1999 | Lake et al. | |
| 6,033,257 A | 3/2000 | Lake et al. | |
| 6,041,263 A | 3/2000 | Boston et al. | |
| 6,047,221 A | 4/2000 | Piche et al. | |
| 6,055,483 A | 4/2000 | Lu | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,094,600 A | 7/2000 | Sharpe, Jr. et al. | |
| 6,106,785 A | 8/2000 | Havlena et al. | |
| 6,108,616 A | 8/2000 | Borchers et al. | |
| 6,110,214 A | 8/2000 | Klimasaukas | |
| 6,122,555 A | 9/2000 | Lu | |
| 6,128,279 A | 10/2000 | O'Neil et al. | |
| 6,421,571 B1 | 7/2002 | Spriggs et al. | |
| 6,442,515 B1 * | 8/2002 | Varma et al. | 703/22 |
| 6,502,148 B1 * | 12/2002 | Krum | 710/110 |
| 6,591,244 B2 * | 7/2003 | Jim et al. | 705/9 |
| 6,792,603 B2 * | 9/2004 | Aizono et al. | 719/310 |
| 6,973,491 B1 * | 12/2005 | Staveley et al. | 709/224 |
| 2003/0009250 A1 * | 1/2003 | Resnick et al. | 700/94 |
| 2003/0195934 A1 * | 10/2003 | Peterson et al. | 709/206 |

FOREIGN PATENT DOCUMENTS

GB  2 349 958  11/2000

OTHER PUBLICATIONS

"GE Predictor™ Services: GE Predictor Services Overview," GE Industrial Systems, available at http://www.geindustrial.com/cwc/services?id=71 on Jul. 18, 2002.

"Electrical Equipment Coverage," GE Industrial Systems, available at http://www.geindustrial.com/cwc/services?id=72 on Jul. 18, 2002.

"Customer Impact," GE Industrial Systems, available at http://www.geindustrial.com/cwc/services?id=73 on Jul. 18, 2002.

"Components of GE Predictor™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

"Microsoft DirectPlay: Changes for Supporting Ripple Launch," Microsoft Corporation, Oct. 1999, available at http://msdn.microsoft.com/library/default.asp?url=/library/en-us/dnplay/html/ripple_launch.asp.

Office Action dated Nov. 30, 2007 issued by State Intellectual Property Office of P.R. China in corresponding application No. 200380105628.8.

Second Office Action dated Apr. 17, 2009 issued by State Intellectual Property Office of P.R. China in corresponding application No. 200380105628.8.

* cited by examiner

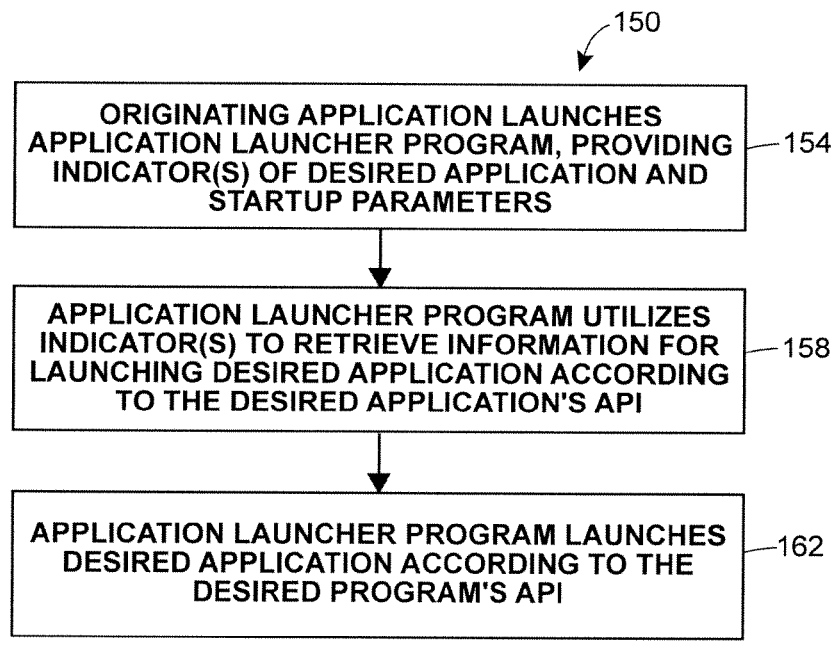
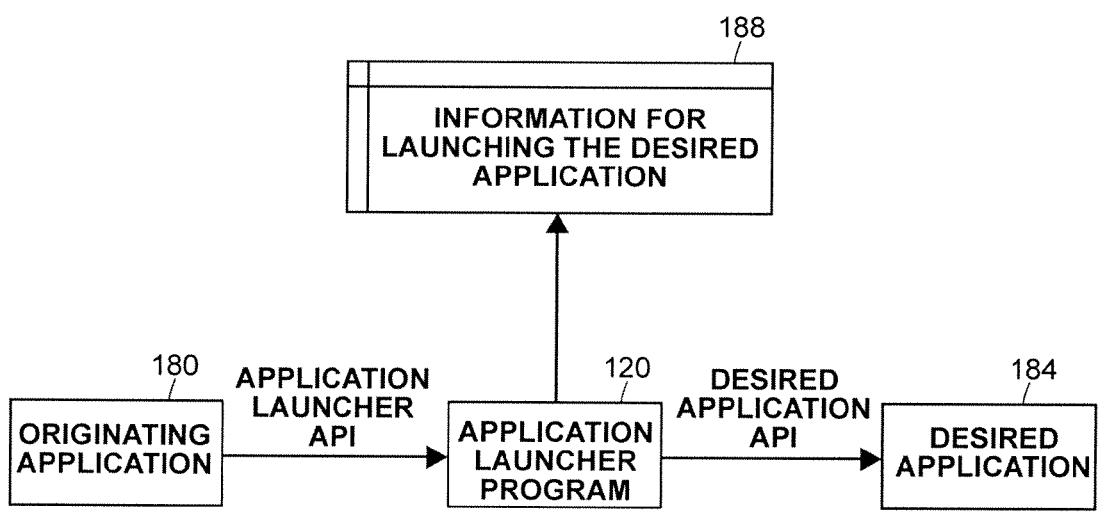

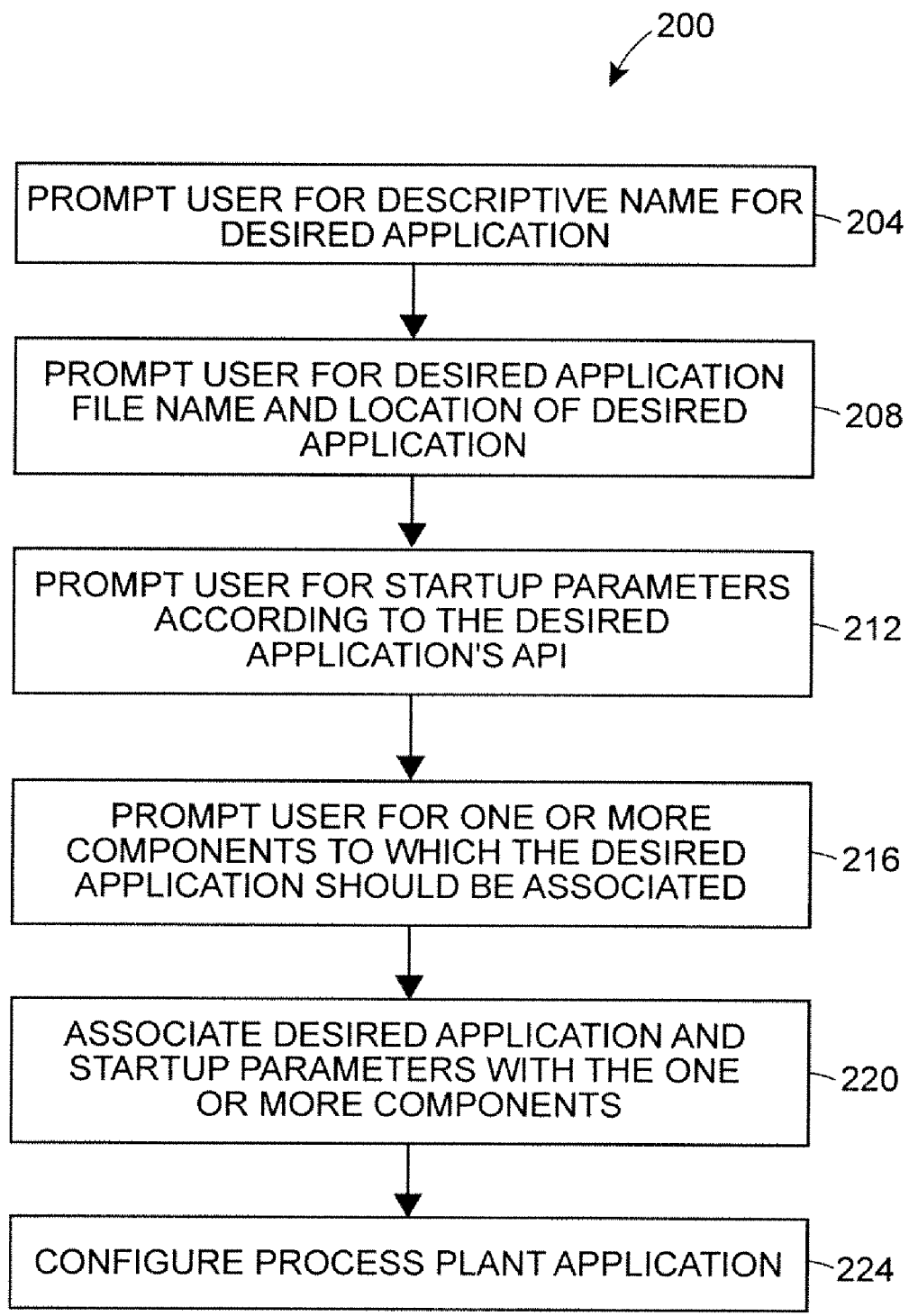

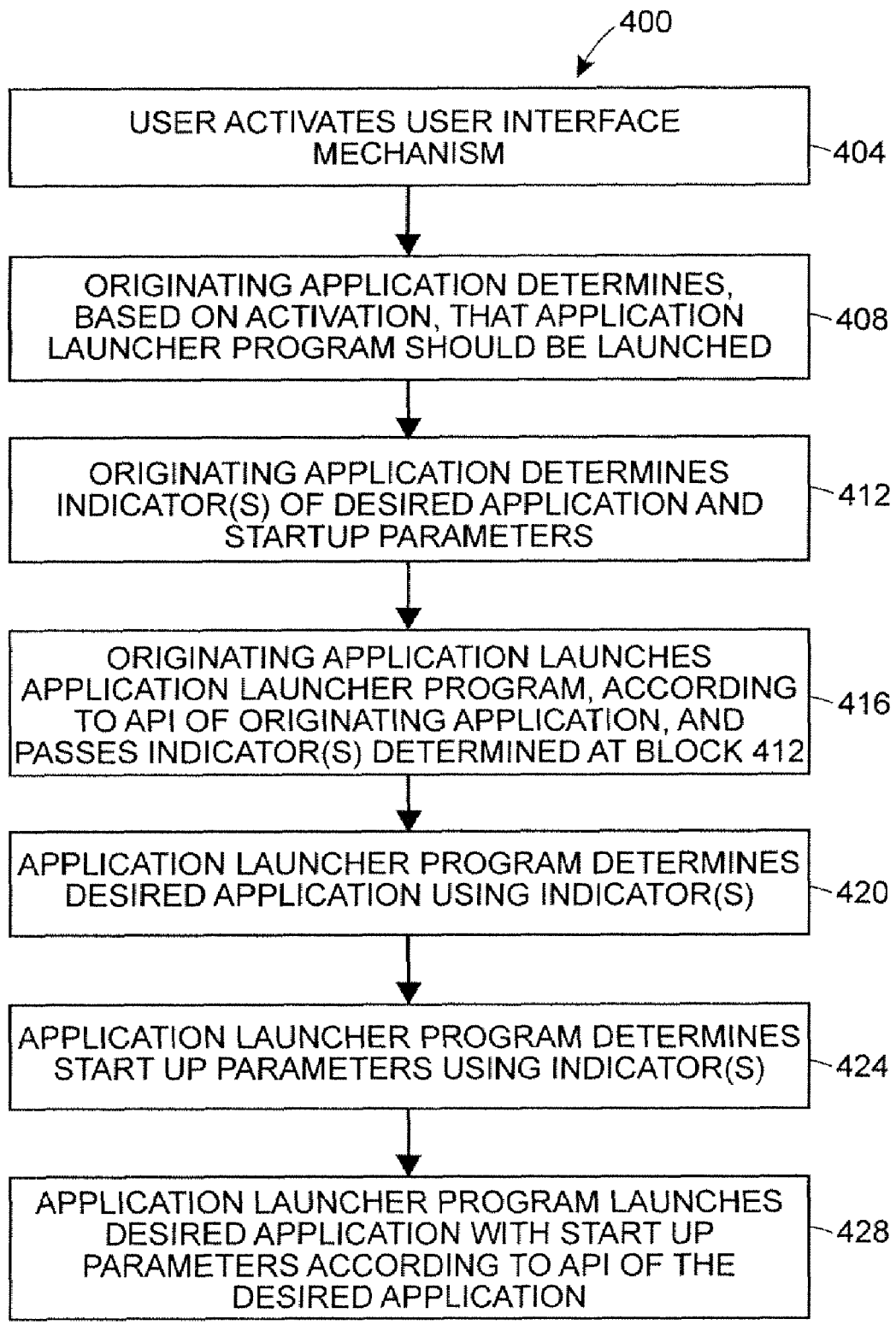

METHOD FOR LAUNCHING APPLICATIONS

FIELD OF THE DISCLOSURE

The present disclosure generally relates to process plants, and, more particularly, to launching applications from an originating application in a process plant.

BACKGROUND

Process plants, like those used in chemical, petroleum, manufacturing or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), are located within the process environment and perform process functions such as opening or closing valves, measuring process parameters, etc. Smart field devices, such as the field devices conforming to a well-known fieldbus protocol (e.g. the Foundation Fieldbus protocol, the HART protocol, etc.) may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Foundation Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, simulating the operation of the process for the purpose of training personnel or testing the process control software, keeping and updating a configuration database, etc.

As an example, control systems, such as the DeltaV™ control system sold by Emerson Process Management, may include multiple applications stored within and executed by different hardware devices located at diverse places within a process plant. For instance, a control system may include a configuration application that resides in one or more workstations. The configuration application may enable users to create or change process control modules and download these process control modules via a data highway to dedicated distributed controllers. The configuration application may also allow a designer to create or change user interfaces which are used by a viewing application to display data to a user and to enable a user to change settings, such as set points, within the process control routine.

Similarly, the control system may include a configuration database application that may be executed, for example, by the same workstation(s) which execute the configuration application, or by a different hardware device coupled to the data highway. The configuration database application may store the current process control routine configuration and data associated therewith in a configuration database. Also, the control system may include a data historian application that may be executed by a data historian device. The data historian application controls the data historian device to collect and store some or all of the data provided across the data highway.

Additionally, a control system may include controller applications that may be stored and executed on a dedicated controller and, in some cases, field devices. A controller application may run control modules, which have been assigned and downloaded to the controller or field device, to implement actual process control.

Further, a control system may include viewing applications that may be executed on one or more operator workstations. A viewing application may receive data, for example, from a controller application via a data highway and display this data to process plant designers, operators, or users using user interfaces. The user interfaces may provide any of a number of different views, such as an operator's view, an engineer's view, a technician's view, etc.

As another example, management systems, such as the AMS predictive maintenance software sold by Emerson Process Management, may interact with one or more smart field devices to read the device, block, parameter, variable, or configuration information associated with those devices. Typically, a management system may reside on one or more operator workstations having appropriate communication ports which allow it to interconnect to, communicate with, and reconfigure a smart device. Management systems may be on-line, that is, have a hard-wired or any other permanent connection with a smart device. Management systems may also be portable and be capable of being periodically connected to a smart device to reconfigure or troubleshoot problems with that smart device.

Management systems typically perform a wide variety of functions with respect to smart devices within a system. For example, management systems may be used to provide users with information (e.g., values of variables or parameters) pertaining to the state of a process and to each of the smart field devices associated with or connected to the process. Management systems may also be used to enable a user to monitor a process and control the process by reconfiguring smart devices within the process as necessary.

A management system may include one or more core applications as well as add-on applications provided, for example, by individual smart device manufacturers to implement changes on, and read data from, a particular smart device. A core application may, for example, include a graphical user interface that provides hierarchical views of devices in a plant or process. A core application may also, for example, provide a base functionality for interfacing with certain devices. For instance, a core application may permit a user to configure and/or read data from HART devices at a generic level. An add-on application may, for example, permit a user to configure and/or read data from devices that communicate via protocol other than that (those) supported by a core application. Also, an add-on application may, for example, permit a user to configure and/or read data from devices at level beyond the generic level supported by a core application. Further, management systems may utilize other applications such as word processing programs, spreadsheet programs, internet browsing programs, etc. For example, a management system may utilize an internet browsing program to display on-line maintenance documents made available by a device manufacturer.

Applications in a process plant often launch other applications. For example, a management system may launch a first application provided by a first smart device manufacturer to configure a first smart device. Also, the management system may launch a second application provided by a second smart device manufacturer to configure a second smart device. Similarly, a management system may launch a web browser to display a web page that provides information about a particular device.

Various applications to be launched often do not share a common or consistent application program interface (API). Therefore, an originating application that launches multiple other applications, often includes multiple custom launching mechanisms. Developing such multiple launching mechanisms can be cumbersome and time consuming. Additionally, if it is desired to provide a new application that can be launched from an existing originating application, a new custom launching mechanism is typically developed, and the originating application modified to include the new custom launching mechanism.

SUMMARY OF THE DISCLOSURE

The examples described herein are generally related to launching desired applications via an originating application in a process plant. It may be desired for an originating application to be able to launch multiple desired applications, with one or more of the desired applications having a different application programming interface. In one example, the originating application is able to launch multiple desired applications via an application launcher program, subroutine, object, etc. The originating application provides the application launcher program, subroutine, object, etc. with an indication of the desired application to be launched, and the application launcher program, subroutine, object, etc. then launches the indicated desired application.

A convenient user interface may be used to configure the process plant application to launch multiple desired applications via the application launcher program. In one example, a user may be prompted to indicate at least one desired application. For instance, the user may be prompted to specify a name of an executable file of a desired application, and may also be prompted to specify a location (e.g., a path) of the executable file. Additionally, the user may be prompted to indicate a component in a process plant, with which the at least one desired application is to be associated. In the case of a management system application, the user may be prompted to specify a device type with which the desired application is to be associated. Then, the at least one desired application may be associated with the at least one component. For instance, an indication of the desired application may be stored in a file associated with a specified component of the process plant.

BRIEF DESCRIPTION OF THE DRAWINGS

The features and advantages of the examples described herein will be best appreciated upon reference to the following detailed description and the accompanying drawings, in which:

FIG. 4 is a flow diagram of an example method for launching a desired application via an application launcher program;

FIG. 5 is a block diagram illustrating an example technique for launching a desired application via an application launcher program;

FIG. 6 is a flow diagram of an example method for configuring a process plant application for launching a desired application via an application launcher program;

FIG. 12 is a flow diagram of an example method for launching a desired application via an application launcher program.

DETAILED DESCRIPTION

For ease of illustration, some of the following examples are described in the context of a management software application in a process plant. It will be appreciated by one of ordinary skill in the art, however, that the techniques described herein can be used in other aspects of a process plant such as a control system application, a device or equipment management application, a simulation application, documentation system, work order management system, enterprise resource planning system, procurement system, etc.

System Overview

Figure 1:
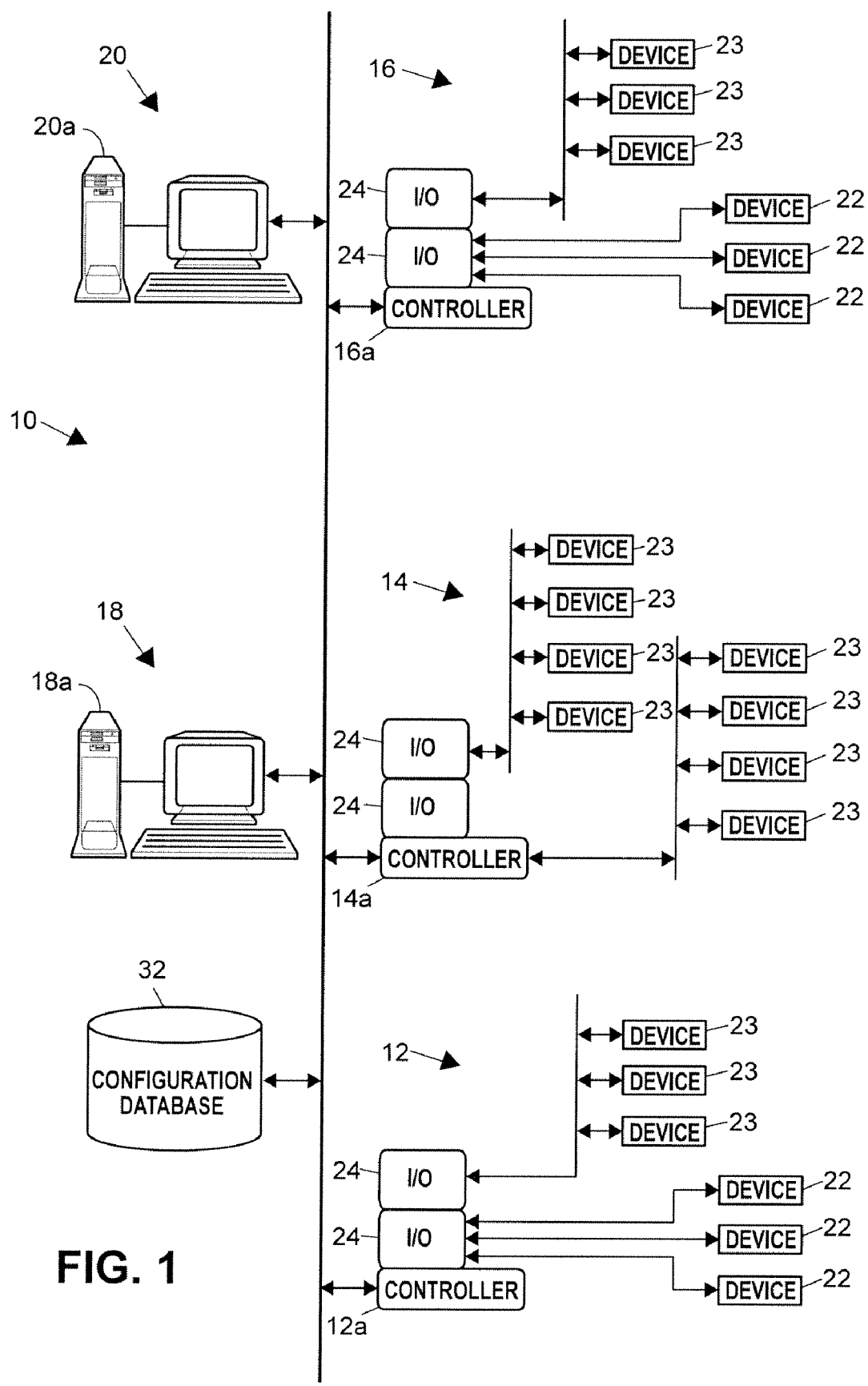
FIG. 1 is a block diagram of an example process plant that may utilize techniques described herein for launching a desired application.

FIG. 1 is a block diagram of an example process plant 10. The process plant 10 includes one or more nodes 12, 14, 16, 18 and 20. In the example process plant 10 of FIG. 1, each of the nodes 12, 14 and 16 includes a process controller 12a, 14a, 16a connected to one or more field devices 22 and 23 via input/output (I/O) devices 24 which may be, for example, Foundation Fieldbus interfaces, HART interfaces, etc. The controllers 12a, 14a and 16a are also coupled to one or more host or operator workstations 18a and 20a in the nodes 18 and 20 via a data highway 30 which may be, for example, an Ethernet link. While the controller nodes 12, 14, 16 and the input/output and field devices 22, 23 and 24 associated therewith are typically located down within and distributed throughout the sometimes harsh plant environment, the operator workstation nodes 18 and 20 are usually located in control rooms or other less harsh environments easily assessable by controller personnel.

Generally speaking, the workstations 18a and 20a of the nodes 18 and 20 may be used to store and execute applications used to configure and monitor the process plant 10, and to manage devices 22, 23 in the process plant 10. Further, a database 32 may be connected to the data highway 30 and operate as a data historian and/or a configuration database that stores the current configuration of the process plant 10 as downloaded to and/or stored within the nodes 12, 14, 16, 18 and 20.

Each of the controllers 12a, 14a and 16a, which may be by way of example, the DeltaV controller sold by Emerson Process Management, may store and execute a controller application that implements a control strategy using a number of different, independently executed, control modules or blocks. The control modules may each be made up of what are commonly referred to as function blocks wherein each function block is a part or a subroutine of an overall control routine and operates in conjunction with other function blocks (via communications called links) to implement process control loops within the process plant 10. As is well known, function blocks typically perform one of an input function (such as that associated with a transmitter, a sensor or other process parameter measurement device), a control function (such as that associated with a control routine that performs PID, fuzzy logic, etc. control), or an output function which controls the operation of some device (such as a valve, to perform some physical function within the process plant 10). Of course hybrid and other types of function blocks exist and may be utilized. While a fieldbus protocol and the DeltaV system protocol may use control modules and function blocks designed and implemented in an object oriented programming protocol, the control modules could be designed using any desired control programming scheme including, for example, sequential function block, ladder logic, etc. and are not limited to being designed using function block or any other particular programming technique. As is typical, the configuration of the control modules as stored within the process control nodes 12, 14 and 16 is stored in the configuration database 32 which is accessible to applications executed by the workstations 18a and 20a.

In the system illustrated in FIG. 1, the field devices 22 and 23 coupled to the controllers 12a, 14a and 16a may be standard 4-20 ma devices, or may be smart field devices, such as HART, Profibus, or Foundation Fieldbus field devices, which include a processor and a memory. Some of these devices, such as Foundation Fieldbus field devices (labeled with reference number 23 in FIG. 1), may store and execute modules, or sub modules, such as function blocks, associated with the control strategy implemented in the controllers 12a, 14a and 16a. Of course, the field devices 22, 23 may be any types of devices, such as sensors, valves, transmitters, positioners, etc. and the I/O devices 24 may be any types of I/O devices conforming to any desired communication or controller protocol such as HART, Foundation Fieldbus, Profibus, etc.

Figure 2:
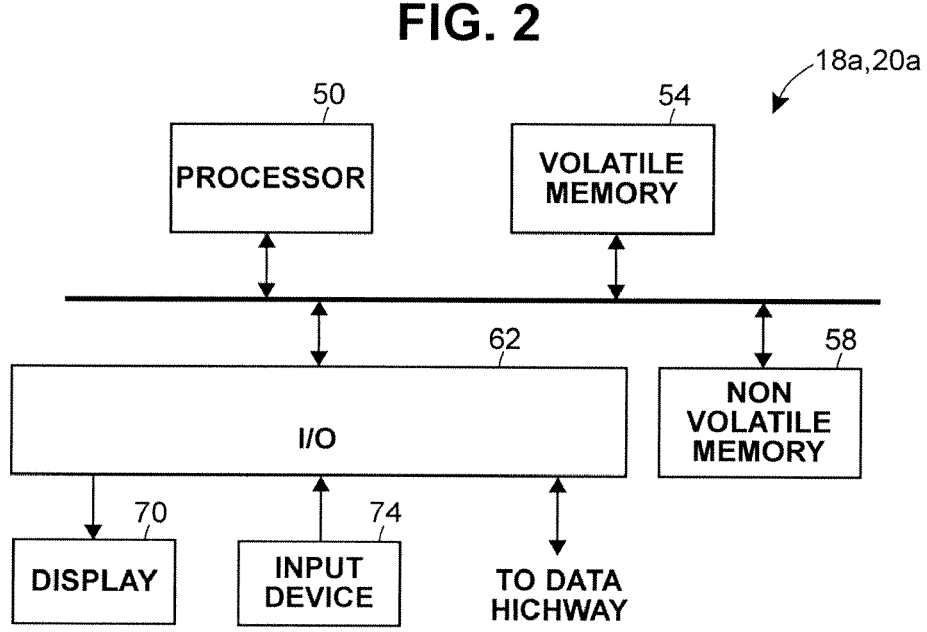
FIG. 2 is a block diagram of an example workstation that may be included in the example process plant of FIG. 1.

A management application may be stored on and executed by one or more of workstations 18a and 20a. FIG. 2 is a block diagram of example workstation 18a (workstation 20a may comprise a same or similar device). The workstation 18a may include at least one processor 50, a volatile memory 54, and a non-volatile memory 58. The volatile memory may include, for example, a random access memory (RAM). The non-volatile memory may include, for example, one or more of a hard disk, a read-only memory (ROM), a compact disk ROM (CD-ROM), a digital versatile disk (DVD), a FLASH memory, etc. The workstation 18a may also include an input/output (I/O) device 62. The processor 50, volatile memory 54, non-volatile memory 58, and I/O device 62 may be interconnected via an address/data bus 66. The workstation 18a may also include at least one display 70 and at least one input device 74. The input device may include, for example, one or more of a keyboard, a keypad, a mouse, etc.

The display 70 and the input device 74 are coupled with the I/O device 62. Additionally, the workstation 18a is coupled with the data highway via the I/O device 62. Although I/O device 62 is illustrated in FIG. 2 as one device, it may comprise several devices.

A management application may be stored, for example, in whole or in part, in the non-volatile memory 58 and executed, in whole or in part, by the processor 50.

Application Launcher Overview

Figure 3:
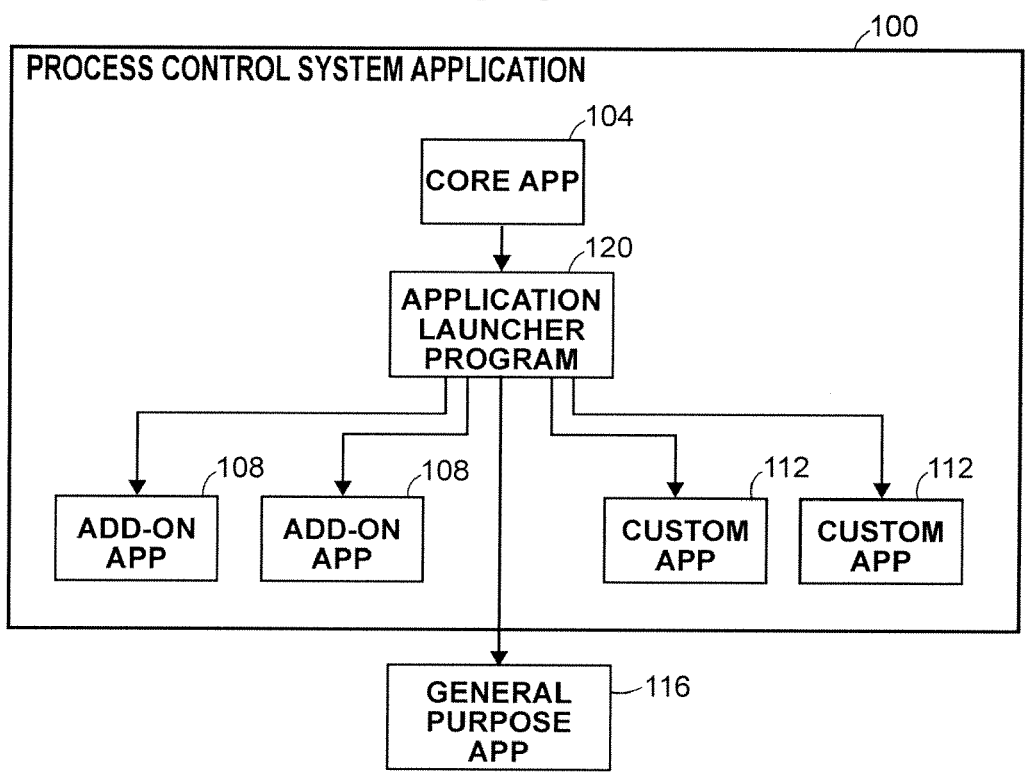
FIG. 3 is a block diagram of an example process plant application that may utilize an application launcher program.

FIG. 3 is a block diagram of an example process plant application 100. For ease of explanation, FIG. 3 will be described in the context of a management system application. It is to be understood, however, that the process plant application 100 may be any of various types of application employed in a process plant (e.g., a control system application, a device or equipment management application, a simulation application, etc.). The process plant application 100 may include one or more core applications 104, and may also include one or more add-on applications 108 and/or one or more custom applications 112. In a management system application, a core application 104 may, for example, provide a base functionality for communicating with and configuring certain types of devices (e.g., HART devices, Fieldbus devices, etc.) and/or provide a graphical user interface for displaying devices in a process plant.

In a management system, an add-on application 108 may be, for example, an application, provided by a manufacturer of a device, that permits communication and configuration resources for a device for which the core application 104 does not provide such resources. Similarly, an add-on application 108 may be, for example, an application, provided by a manufacturer of a device, that permits communication and configuration resources for a device beyond those provided by the core application 104. In a management system, a custom application may be, for example, an application developed by an end user that provides a level of communication and configuration resources not provided by a core application 104 or an add-on application 108.

The process plant application 100 may also utilize one or more general purpose applications 116, such as a word processing application, a spreadsheet application, a web browsing application, etc. The process plant application 100 may further include an application launcher program 120.

An application, such as core application 104, can launch applications, such as add-on applications 108, custom applications 112, and general purpose applications 116, via the application launcher program 120. In the example illustrated in FIG. 3, core application 104 uses application launcher program 120 to launch other applications such as add-on applications 108, custom applications 112, and general purpose applications 116. The core application 104, however, need not use application launcher 120 to launch every application. Additionally, in some examples, other applications besides core application 104 may utilize the application launcher program 120 or a separate application launcher program (not illustrated) similar to application launcher program 120. For example, an add-on application 108 may launch a general purpose application 116 via a separate application launcher program (not illustrated).

Each of the add-on applications 108, the custom applications 112, and the general purpose applications 116, potentially, may have a unique API. Thus, by utilizing the application launcher program 120, the core application 104 may launch multiple applications, having multiple APIs, via potentially only a single API.

FIG. 4 is a flow diagram illustrating an example method 150 of launching an application via an application launcher program. For ease of explanation, the flow of FIG. 4 will be described with reference to FIG. 5, which is a block diagram illustrating an example operation of an originating application 180 utilizing the application launcher program 120 to launch a desired application 184. Additional examples of methods for utilizing an application launcher program will be described below.

At block 154, an originating application 180 launches the application launcher program 120. The originating application 180 may be, for example, a core application of a process plant application. When launching the application launcher program 120, the originating application 180 may provide to the application launcher program 120 an indication of the particular desired application 184 to be launched. Additionally, the originating program 180 may provide to the application launcher program 120 an indication of startup parameters which may be used to launch the desired application 184. It will be appreciated by one of ordinary skill in the art that the indication of the desired application 184 and the indication of startup parameters may be a single indicator or multiple indicators.

The launching of the application launcher program 120 and the providing of the indicator or indicators of the desired application 184 and the startup parameters may be performed according to an API of the application launching program 120. It will be appreciated by those of ordinary skill in the art that the API of the application launching program 120 may be designed to match a portion of the API of the originating application 180 that corresponds to program launching.

At block 158, the application launching program 120 may utilize the indicator or indicators of the desired application 184 and the startup parameters to retrieve information 188 related to launching the desired application 184 according to the API of the desired application 184. The information 188 may include, for example, a file name of the desired application 184, a location of the desired application 184 (e.g., a path name), startup parameters to be provided to the desired application 184 in an order and syntax according to the API of the desired application 184 (e.g., a command line), etc. The information 188 may be stored, for example, in a file, database, etc., such that the application launching program 120 can use the indicator or indicators of the desired application 184 and the startup parameters to retrieve the information 188. The indicator(s) may include, for example, a file name in which the information 188 is stored, a location within a file, a database query for retrieving the information 188 from a database, a URL, an XML document, a HTTP GET, etc.

At block 162, the application launcher program 120 utilizes the information 188 to launch the desired application according to an API of the desired application 184. If startup parameters are provided, the desired application 184 may be considered to be launched "in-context." For example, if the desired application 184 is a web browser, the web browser may be launched displaying a particular web page.

Configuring the Process Plant Application

FIG. 6 is a flow diagram illustrating an example method 200 for configuring a process plant application in which an originating application can launch a desired application via an application launcher program. At block 204, a user may be prompted to provide a descriptive name for a desired application. The descriptive name may be used, for example, in providing a graphical user interface mechanism via which a user can initiate a launch of the desired application.

At block 208, the user may be prompted to provide a file name and a location of an executable file of the desired application. At block 212, the user may be prompted to provide startup parameters for the desired application. The types of startup parameters that may be provided may be determined, in part, by the API of the desired application. Additionally, the user may specify, for example, an ordering, a syntax, etc., of the startup parameters that correspond to the desired application's API.

At block 216, the user may be prompted to specify one or more components in a process plant with which the desired application should be associated. For instance, in a control system application, the user may specify one or more of a controller, a module, a device, etc., used in a process. In a management system application, the user may specify, for example, a specific device, a device type, etc.

At block 220, the desired application and the startup parameters may be associated with the one or more components (which the user was prompted to specify at block 216). For instance, a text file may be created that includes the file name and path of the executable file and the startup parameters to be used in launching the desired application. The text file may be given a unique name that can be associated with the component(s) (which the user was prompted to specify at block 216).

At block 224, the process plant application may be configured to reflect the association between the desired application (which the user was prompted to specify at block 208) and the component(s) (which the user was prompted to specify at block 216). For instance, an originating application of the process plant application may be configured to provide a user interface mechanism for initiating a launch of the desired application. The user interface mechanism may be associated with the component(s). As a specific example, a menu associated with the component(s) may be configured to include an item having the descriptive name which the user was prompted to specify at block 204. Continuing with the example described with reference to block 220, the menu item may be associated with the text file that includes the file name and path of the executable file and the startup parameters to be used in launching the desired application.

Configuring a Management System Application

Figure 7:
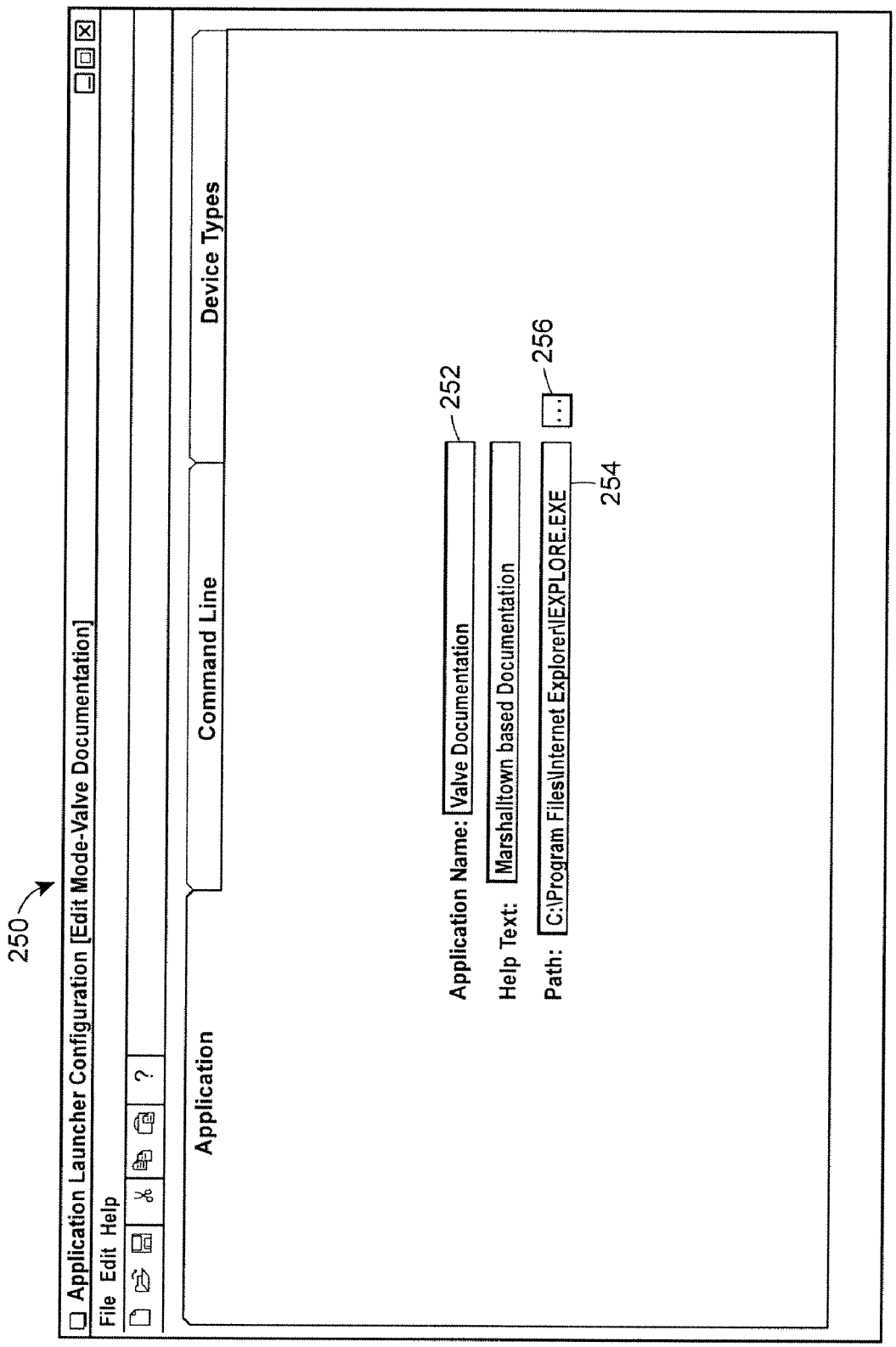
FIG. 7 is an example user interface for configuring a process plant application for launching a desired application via an application launcher program.
Figure 8:
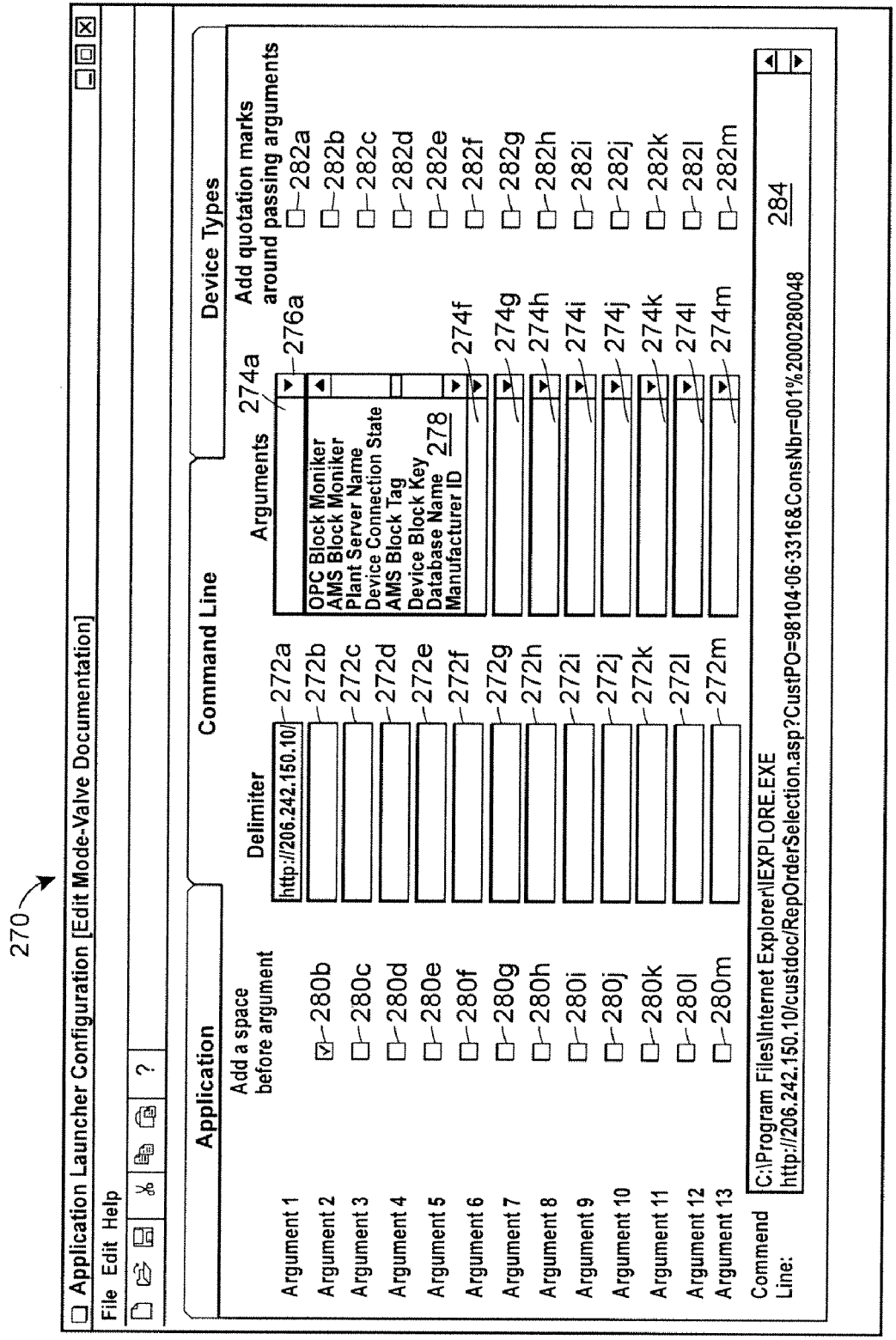
FIG. 8 is an example user interface for configuring a process plant application for launching a desired application via an application launcher program.
Figure 9:
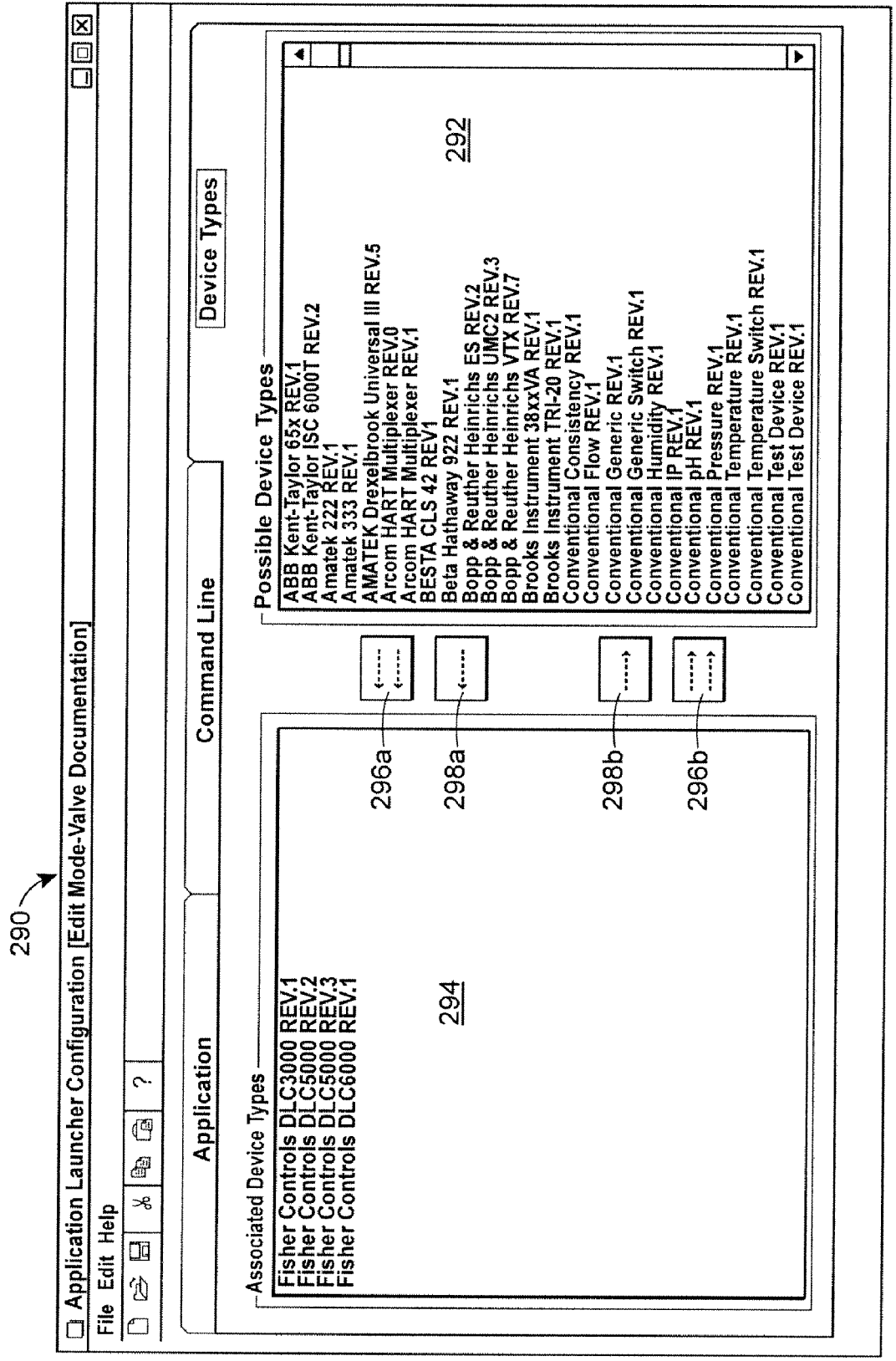
FIG. 9 is an example user interface for configuring a process plant application for launching a desired application via an application launcher program.

FIGS. 7-9 are an example user interface that may be utilized to implement blocks 204, 208, 212, and 216 of FIG. 6 for a management system application. In particular, FIG. 7 is an example user interface 250 that may be used for prompting a user to provide a descriptive name (block 204 of FIG. 6), a filename of an executable file for the desired application (block 208 of FIG. 6), and a location of the executable file (block 212 of FIG. 6). For instance, a user may type in a descriptive name for the desired application in box 254. In block 258, a user may type in a path and executable file name. Additionally, a user may "browse" for the path and executable file name in a manner well known to those of ordinary skill in the art by selecting button 262.

FIG. 8 is an example user interface 270 that may be used for prompting a user to provide startup parameters for the desired application (block 212 of FIG. 6). The user interface includes boxes 272a-272m and 274a-274m for specifying parameters. Parameters can be passed to the desired application in order (e.g., "Argument 1", then "Argument 2", then "Argument 3", etc.). In this way, the user may select the order in which to pass the parameter to correspond, for example, with an API of the desired application. A user may type in parameters in boxes 272a-272m. Additionally, using boxes 274a-274m, a user may pass "Arguments" to the desired application. An argument may correspond, for example, to a type of information corresponding to a device. In an example in which the management system application includes the AMS predictive maintenance software sold by Emerson Process Management, arguments may include AMS Username (the AMS login name of a user), OPC Block Moniker (a device's Object Linking and Embedding (OLE) for Process Control (OPC)

format block moniker), Plant Server Name (the name of the server for a connected device), Device Connection State (indicates whether a device is "live", i.e., "connected" or "not connected"), AMS Block Tag (a device icon label for a device that may be displayed to the user in, for example, the AMS device connection view or the AMS plant server view), Device Block Key (a number used for database device references, commonly required for structured query language (SQL) database accesses), Database Name (the domain name server (DNS) name of the database for a device), Manufacturer ID (a number that indicates a device's manufacturer), Device Type (a number that indicates a device type or model), HART Revision (a number that indicates a HART protocol revision supported by a device), Device ID (a number that indicates a specific device for a given Manufacturer ID and Device Type), etc. The user interface 270 may include buttons 276a-276m to permit a user to select an argument from, for example, a pull-down menu such as menu 278. By specifying one or more arguments via boxes 274a-274m, a user may specify a type of information to be passed to the desired application, rather than specifying specific information.

Using user interface 270, a person may specify an appropriate syntax for passing information to the desired application. For instance, using boxes 280b-280m, 272a-272m, and 282a-282m, a user may add spaces, delimiters, and/or quotation marks and create a "command line" that includes the parameters in the appropriate syntax. Box 284 may provide the user with a view of the command line as it is being created so, for example, the user can verify that the correct syntax is being used.

FIG. 9 is an example user interface 290 that may be used for prompting a user to specify one or more devices with which the desired application should be associated (block 216 of FIG. 6). The user interface 290 may include a list 292 of possible devices and/or device types. A user may select devices and/or device types to be associated with the desired application by selecting buttons 296a and 298a. For example, by selecting button 296a, the user may select all of the devices and/or device types in list 292. Additionally, the user may highlight one or more individual devices and/or device types in list 292, and then select those one or more devices and/or device types by selecting button 298a.

The user interface 290 may also include a list 294 of devices and/or device types that have been selected to be associated with the desired application. The user may use button 296b to "deselect" all of the devices and/or device types in list 294. Additionally, the user may highlight one or more individual devices and/or device types in list 294, and the select button 298b to "deselect" those devices and/or device types.

Because the user interfaces 250, 270, and 290 may permit a user to associate a desired application with a device type, the user, in effect, may be able to associate the desired application with, potentially, multiple devices. Thus, the user need not associate the desired application with each device, individually. In other examples, the user may be permitted to associate desired applications with individual devices.

Continuing with the example described with reference to FIGS. 7-9, associating the desired application and startup parameters with the one or more devices (block 220 of FIG. 6) may include storing an indication of the association in a file, such as a configuration file. If the management system application is implemented with a WINDOWS™ operating system available from Microsoft Corporation (e.g., WINDOWS XP™, WINDOWS 2000™, WINDOWS NT™, etc.), indication(s) of the association may be stored, for example, in an INI file and/or a Registry file. For instance, the information obtained via the user interface described with reference to FIGS. 7-9 may be stored in an INI file.

Figure 10:
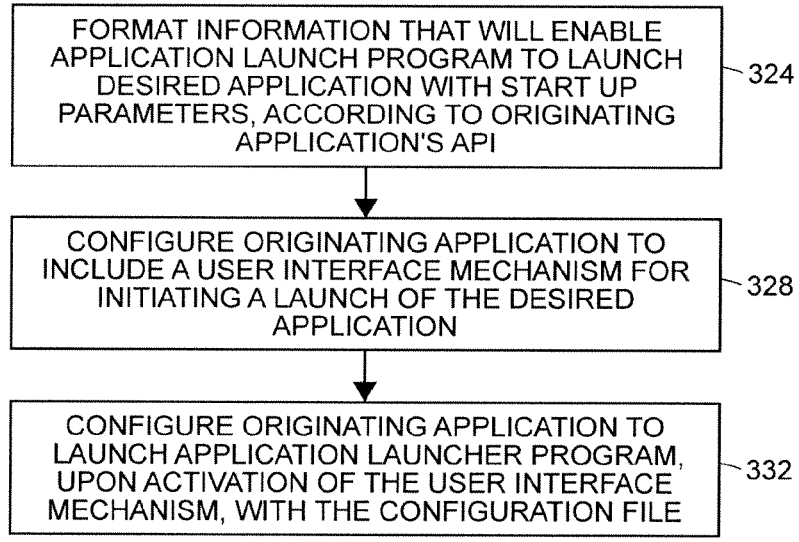
FIG. 10 is a flow diagram of an example method for configuring a management system application for launching a desired application via an application launcher program.

FIG. 10 is a flow diagram of an example method 320 for configuring the management system application (block 224 of FIG. 6). At block 324, information that will enable the application launcher program to launch the desired program is formatted according to the standard API of the originating program. Alternatively, the information may be formatted according to an API that is not standard for the originating program. For example, a standard API of the application program launcher could be employed.

In one specific example, the desired application's executable file and path may be stored in a file. Additionally, parameters assembled into a command line via, for example, a user interface such as user interface 270 (FIG. 8) may also be stored in the file.

At block 328, an originating application of the management system application is configured to include one or more user interface mechanisms for initiating a launch of the desired application. For instance, if the user specified one or more device types via user interface 290 (FIG. 9), and the process or plant includes multiple devices of that type or types, multiple user interface mechanisms corresponding to the multiple devices may be included.

Figure 11:
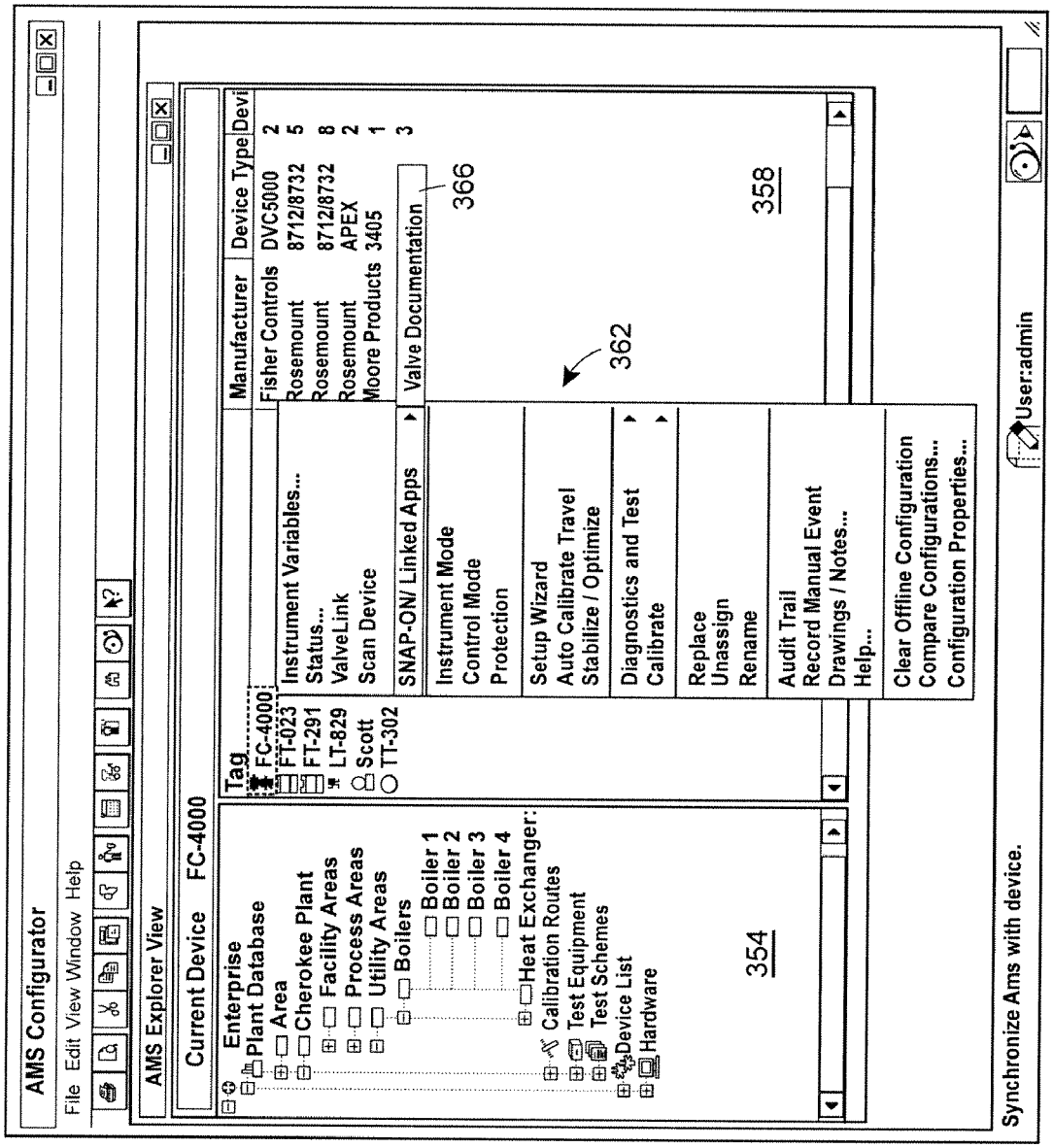
FIG. 11 is an example user interface for a management system application.
Figure 11:
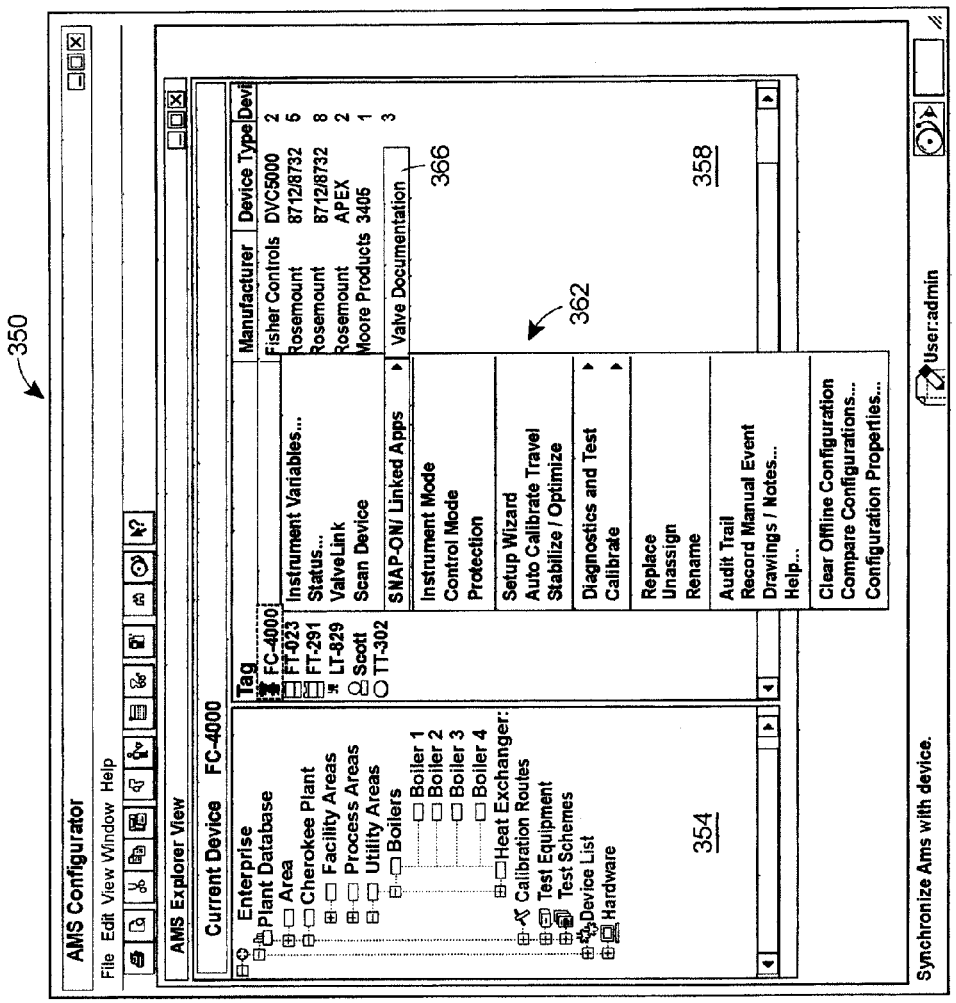

FIG. 11 is a display from an example originating application. In this example, the originating application provides a hierarchical view of devices in a process and/or plant. The display 350 includes a hierarchy portion 354 and a contents portion 358. As is well known to those of ordinary skill in the art, the hierarchy portion 354 provides a hierarchical view of an enterprise, process, and/or plant. Plants, areas within plants, plant components, etc., may be represented, in a hierarchical manner, as folders and subfolders. By selecting a folder in the hierarchy portion 354, with, for example, a mouse, a user can view the contents of that folder in the contents portion 358. In FIG. 11, the folder "Boiler 1" has been selected in the hierarchy portion 354. The folder "Boiler 1" includes six devices as can be seen in the contents portion 358.

In this example, a user has specified, via user interfaces 250, 270, and 290 (FIGS. 7-9) that a desired application with the descriptive name "Valve Documentation" is to be associated with various device types including device type "DVC5000." In FIG. 11, the device "FC-4000," which is of the type "DVC5000," has been selected. In this example, the originating application has been configured to include a menu item 366 in a menu associated with devices of the type "DVC5000." The menu 362 can be displayed, for example, by selecting device "FC-4000" with an activation of a left mouse button, and then activating a right mouse button.

As is well known to those of ordinary skill in the art, for applications designed for a WINDOWS™ type operating system, the originating application may be configured to provide one or more user interface mechanisms, such as a menu item, by modifying a configuration file, such as an INI file associated with the origination application, or a "registry" file.

At block 332, the originating application may be configured to launch the application launcher program upon activation of the user interface mechanism (block 328). Additionally, the originating application may be configured to launch the application launcher program with the information formatted at block 324. Continuing with the example described with reference to block 324, the originating application may be configured, when launching the application launcher program, to indicate to the application launcher program the name and location of the file created at block 324. As is well known to those of ordinary skill in the art, for applications designed for a WINDOWS™ type operating system, the originating application may be so configured by modifying a configuration file, such as an INI file associated with the origination application, or a "registry" file.

Launching the Desired Application

FIG. 12 is a flow diagram illustrating an example method 400 in a process plant application for launching a desired application. The flow of FIG. 12 will be described with reference to FIGS. 11 and 13.

At block 404, a user may activate a user interface mechanism in an originating application. Referring again to FIG. 11, the user may, for example, select a menu item such as menu item 366. At block 408, based on the activated user interface mechanism, the originating application may determine that an application launcher program should be launched. For example, if a menu item is selected by a user, the originating application may determine, based on the selected menu item, that the application launcher program should be launched.

Figure 13:
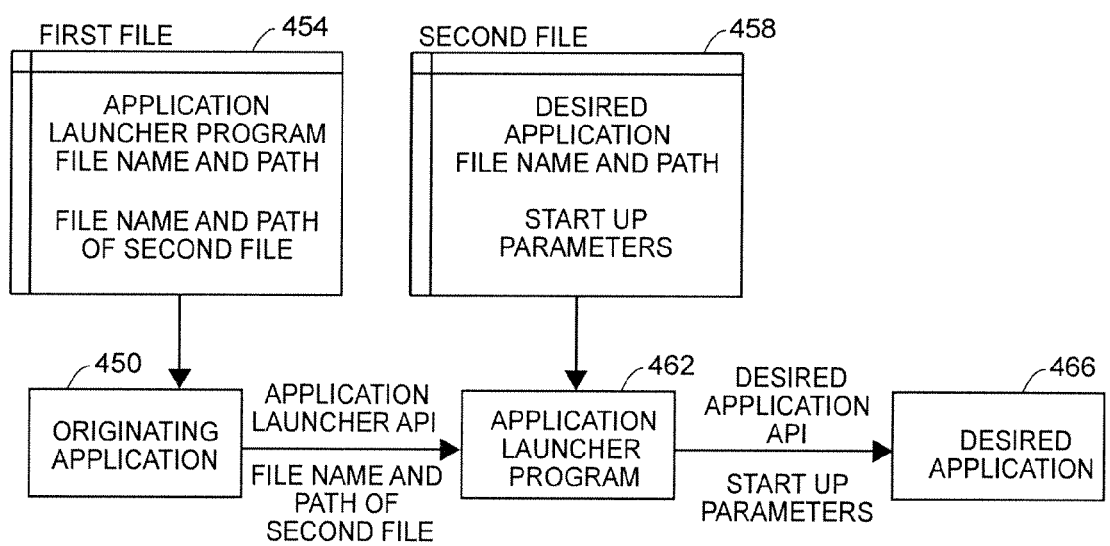
FIG. 13 is a block diagram illustrating an example technique for launching a desired application via an application launcher program.

Referring now to FIG. 13, the originating application 450 may examine a first file, registry, etc., or portion of a file, registry, etc., (first file 454) associated with the menu item selected at block 404. The first file 454 may provide the executable file name and path of the application launcher program, thus indicating that the application launcher program should be launched.

Referring again to FIG. 12, at block 412, the originating application may determine, based on the user interface mechanism activated at block 404, an indicator or indicators of a desired application to be launched and of startup parameters for the desired application. For example, if a menu item is selected by a user, the originating application may determine, based on the selected menu item, an indicator or indicators of a desired application to be launched and of startup parameters for the desired application. In one particular example, the originating application may examine a configuration file or a portion of a configuration file, a registry file, etc., associated with the menu item. This configuration file, registry file, etc., may include a file name and path of another file. This other file may include information regarding the desired application, as well as startup parameters for the desired application.

Referring again to FIG. 13, the originating application 450 may examine the first file 454 associated with the menu item selected at block 404. The first file 454 may provide a file name and path of a second file 458. The second file may include the executable file name and path of the desired application to be launched. Additionally, the second file may include startup parameters for the desired application in a format according to the API of the desired application. For example, the startup parameters may be in a format assembled using the user interface 270 of FIG. 8.

Referring again to FIG. 12, at block 416, the originating application may launch the application launcher program according to the standard API of the originating application (or a non-standard API). Additionally, the originating application may provide, via the API of the application launcher program, the indicator(s) of the desired application to be launched and its startup parameters. In the example of FIG. 13, the originating application 450 may launch the application launcher program 462, and provide it the name and path of the second file 458.

At block 420, the application launcher program may determine the desired application to be launched, based on the indicator(s) provided at block 416. In the example of FIG. 13, the application launcher program 462 may determine the desired application 466 by examining the second file 458. At block 424, the application launcher program may determine the startup parameters for launching the desired application, based on the indicator(s) provided at block 416. In the example of FIG. 13, the application launcher program 462 may determine the startup parameters by examining the second file 458.

At block 428, the application launcher program may launch the desired application according to the API of the desired application. Additionally, the application launcher program may provide startup parameters to the desired application, according to the API of the desired application. In the example of FIG. 13, the application launcher program 462 may launch the desired application specified in the second file 458. Additionally, the application launcher program 462 may provide to the desired application the startup parameters provided in the second file 458. The startup parameters may be formatted in the second file 458 according to the API of the desired application. For instance, a user may use a user interface such as user interface 270 of FIG. 8 to assemble a "command line" that is formatted according to the API of the desired application.

If the startup parameters include arguments (e.g., Device ID, Device Type, etc.), the application launcher program may determine the value of those arguments, and then, for example, may include those values in the command line. In one example, the originating application (or some other application) may pass the values of a set of arguments (e.g., all arguments, all arguments that could possibly be used by the application launcher program, all arguments that it has been determined that the application launcher program will need, etc.) to the application launcher program upon startup. Also, the originating application (or some other application) may store the values of the set of arguments in a file. Then, when the application launcher needs values of particular arguments for launching a desired application, the application launcher program may determine those values by retrieving the needed values from the set of values passed to the application launcher program, or stored in the file. Then, the application launcher program may provide the values of those arguments to the desired application via the API of the desired application.

One of ordinary skill in the art will recognize that an application launcher program may be implemented as a separate program from the originating application, or as a subroutine, object, etc., of the originating application.

The methods described above may be implemented as software programs for execution by one or more processors. Such programs may be embodied in software stored on a tangible medium such as CD-ROM, a floppy disk, a hard drive, a digital versatile disk (DVD), or a memory associated with the processor, but persons of ordinary skill in the art will readily appreciate that the entire program or parts thereof could alternatively be executed by a device other than a processor, and/or embodied in firmware and/or dedicated hardware in a well known manner. Additionally, although the examples described above were described with reference to the flow diagrams of FIGS. 4, 6, 10, and 12, persons of ordinary skill in the art will readily appreciate that many other methods of implementing these methods may alternatively be used. For example, the order of execution of the blocks may be changed, and/or the blocks may be changed, eliminated, or combined.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

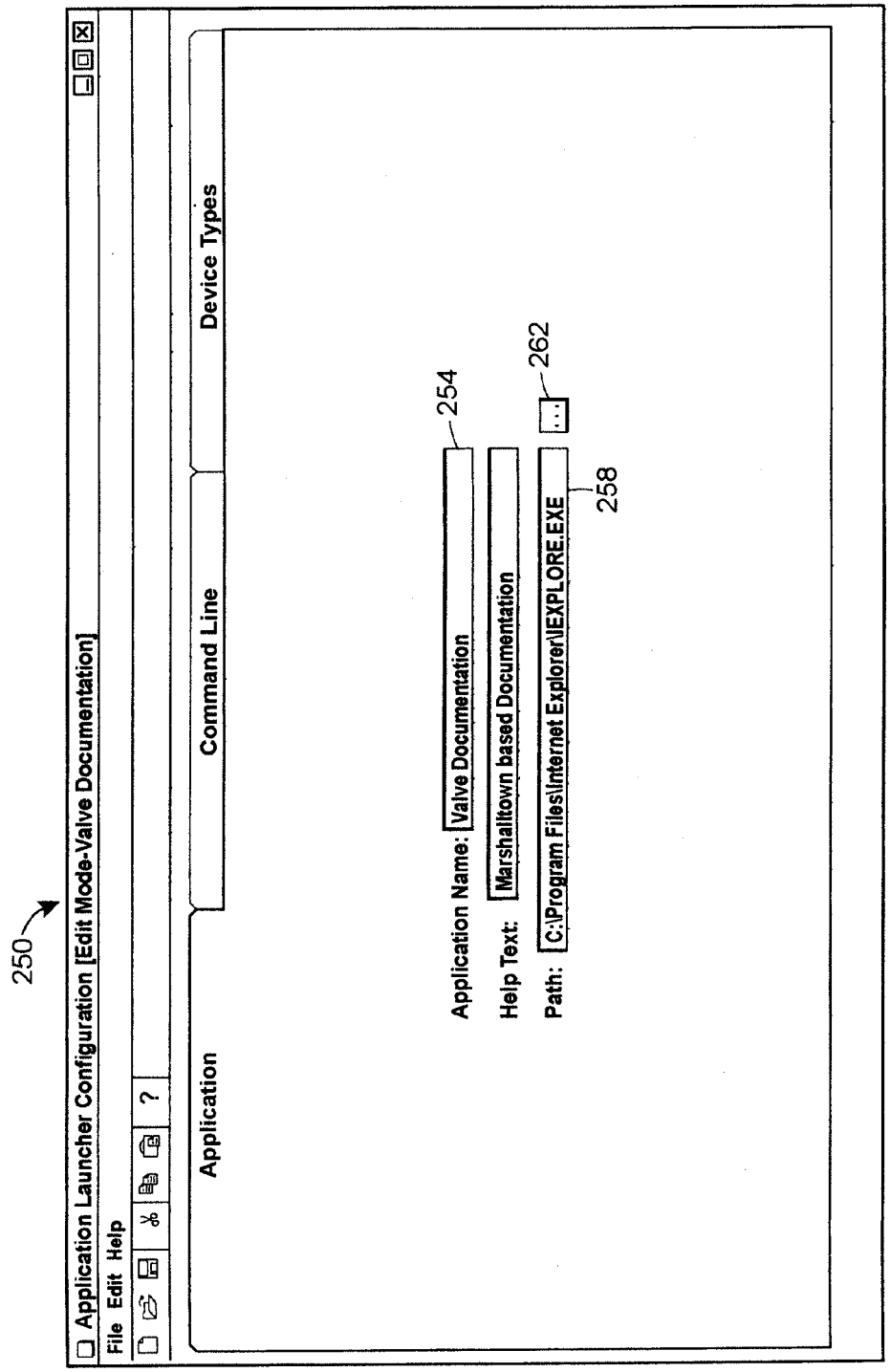

What is claimed is:

1. A method in a process plant for configuring a process plant software system to cause a desired application to launch, the method comprising:
prompting a user to indicate the desired application;
prompting the user to indicate at least one component, in the process plant, with which the desired application is to be associated;
prompting the user to indicate at least one startup parameter to be provided to the desired application via an application program interface (API) of the desired application;
associating the at least one startup parameter and the desired application with the at least one component; and
configuring the process plant software system wherein an originating application is configured to launch the desired application in connection with the at least one component via an API of an application launcher, the originating application executable on an operating system of a computing device of the process plant system, and wherein:
the application launcher is configured to launch the desired application with the at least one startup parameter via the API of the desired application, and
the application launcher is configured to launch a plurality of applications via a plurality of respective APIs, the plurality of applications including the desired application, and the plurality of respective APIs including the API of the desired application.

2. A method as defined in claim 1, wherein the at least one component includes a controller.

3. A method as defined in claim 1, wherein the at least one component includes a control strategy.

4. A method as defined in claim 1, wherein the at least one component includes a module.

5. A method as defined in claim 1, wherein the at least one component includes a device.

6. A method as defined in claim 5, wherein prompting the user to indicate at least one component comprises prompting the user to indicate a specific device.

7. A method as defined in claim 5, wherein prompting the user to indicate at least one component comprises prompting the user to indicate device type.

8. A method as defined in claim 1, wherein associating the desired application with the at least one component comprises storing an indication of an association of the desired application with the at least one component.

9. A method as defined in claim 1, wherein associating the desired application with the at least one component comprises storing an indication of the desired application in a file associated with the at least one component.

10. A method as defined in claim 1, wherein associating the desired application with the at least one component comprises storing an indication of the desired application in a portion of a file, the portion of the file associated with the at least one component.

11. A method as defined in claim 1, wherein associating the at least one startup parameter and the desired application with the at least one component comprises storing an indication of an association of the at least one startup parameter with the desired application and with the at least one component.

12. A method as defined in claim 1, wherein associating the at least one startup parameter and the desired application with the at least one component comprises storing an indication of the at least one startup parameter in a file associated with the at least one component.

13. A method as defined in claim 1, wherein associating the at least one startup parameter and the desired application with the at least one component comprises storing an indication of the at least one startup parameter in a portion of a file, the portion of the file associated with the at least one component.

14. A method as defined in claim 1, wherein prompting the user to indicate at least one startup parameter comprises prompting the user to input at least one parameter.

15. A method as defined in claim 1, wherein prompting the user to indicate at least one startup parameter comprises prompting the user to select at least one startup parameter from a menu of startup parameters.

16. A method as defined in claim 15, wherein the at least one startup parameter comprises at least one argument utilized by the desired application.

17. A method as defined in claim 1, wherein prompting the user to indicate at least one startup parameter comprises prompting the user to specify an ordering of multiple startup parameters.

18. A method as defined in claim 1, wherein prompting the user to indicate at least one startup parameter comprises prompting the user to specify a command line syntax.

19. A method as defined in claim 1, wherein prompting the user to indicate the desired application includes prompting the user to specify a name of an executable file of the desired application.

20. A method as defined in claim 1, wherein prompting the user to indicate the desired application includes prompting the user to specify a location of an executable file of the desired application.

21. A method as defined in claim 1, further comprising modifying the originating application to include a user interface mechanism for launching the desired application, the user interface mechanism associated with the at least one component.

22. A method as defined in claim 21, wherein the user interface mechanism includes an item in a menu, the menu associated with the at least one component.

23. A method as defined in claim 21, wherein modifying the originating application includes modifying a database that includes configuration information associated with the originating application.

24. A method in a process plant for configuring asset management software to cause an application to launch, the method comprising:
prompting a user to indicate a desired application;
prompting a user to indicate at least one startup parameter to be supplied to the desired application via an application program interface (API) of the desired application;
prompting the user to indicate a device to which the desired application is to be associated;
associating the desired application and the at least one startup parameter with the device; and
configuring the asset management software wherein the asset management software is configured to launch the desired application in connection with the device via an API of an application launcher, the asset management software designed to execute on an operating system of a computing device of the process plant, wherein:
the application launcher is configured to launch the desired application with the at least one startup parameter via the API of the desired application, and
the application launcher is configured to launch a plurality of applications via a plurality of respective APIs, the plurality of applications including the desired application and the plurality of respective APIs including the API of the desired application.

25. A method as defined in claim 24, wherein associating the desired application with the device comprises storing an indication of an association of the desired application with the device.

26. A method as defined in claim 24, wherein associating the desired application with the device comprises storing an indication of the desired application in a file associated with the device.

27. A method as defined in claim 24, wherein associating the desired application with the device comprises storing an indication of the desired application in a portion of a file, the portion of the file associated with the device.

28. A method as defined in claim 24, wherein configuring the asset management software comprises configuring the asset management software to include a user interface mechanism for launching the desired application, the user interface mechanism associated with the device.

29. A method as defined in claim 24, wherein prompting the user to indicate the device comprises prompting the user to indicate a specific device.

30. A method as defined in claim 24, wherein prompting the user to indicate the device comprises prompting the user to indicate a device type.

31. A method in a process plant for launching an application, the method comprising:
receiving, via an originating application executing on an operating system of a computing device in a process plant, a user command to launch a desired application;
determining, based on the user command, an indication of the desired application;
retrieving, based on the indication of the desired application, at least one startup parameter to be provided to the desired application via an application program interface (API) of the desired application; and
launching, via an API of an application launcher program, the desired application with the at least one startup parameter via the API of the desired application, wherein the application launcher program is configured to launch a plurality of applications via a plurality of respective APIs, the plurality of applications including the desired application and the plurality of respective APIs including the API of the desired application;
wherein launching the desired application comprises providing the indication of the desired application to the application launcher program via the API of the application launcher program;
wherein the API of the application launcher program is different than the API of the desired program;
wherein the application launcher program retrieves the at least one startup parameter to be provided to the desired application via the API of the desired application;
wherein the application launcher program launches the desired application via the API of the desired application with the at least one startup parameter.

32. A method as defined in claim 31, wherein determining the indication of the desired application includes retrieving, based on the user command, the indication from a file.

33. A method as defined in claim 31, wherein retrieving the information for launching the desired application includes retrieving the information from a file.

34. A method as defined in claim 33, wherein the indication of the desired application comprises the name of the file that includes the information for launching the desired application.

35. A method as defined in claim 31, further comprising determining, based on the user command, an indication of the at least one startup parameter for the desired application.

36. A method as defined in claim 35, wherein the indication of the desired application and the indication of the at least one startup parameter are a single indicator.

37. A method as defined in claim 36, wherein the single indicator comprises a name of a file, wherein the file includes a name of an executable file for the desired application and the at least one startup parameter.

38. A method in a process plant for launching an application, the method comprising:
receiving, via an originating application in a management system application executing on an operating system of a computing device in the process plant, a user command associated with a device in the process plant;
determining, based on the user command, an indication of a desired application;
determining, based on the user command, an indication of at least one startup parameter that is to be provided to the desired application;
retrieving, based on the indication of the desired application, information for launching the desired application according to an application program interface (API) of the desired application;
retrieving, based on the indication of the at least one startup parameter, information for providing the at least one startup parameter to the desired application via the API of the desired application; and
launching the desired application with the at least one startup parameter via an API of an application launcher, wherein the application launcher is configured to launch the desired application with the at least one startup parameter via the API of the desired application and the application launcher is configured to launch a plurality of applications via a plurality of respective APIs, the plurality of applications including the desired application and the plurality of respective APIs including the API of the desired application.

39. A tangible medium storing machine readable instructions comprising:
first software to prompt a user to indicate at least one desired application;
second software to prompt the user to indicate at least one component, in a process plant, with which the at least one desired application is to be associated;
third software to prompt the user to indicate at least one startup parameter to be provided to the desired application via an application program interface (API) of the desired application;
fourth software to associate the at least one desired application with the at least one startup parameter and the at least one component; and
fifth software to enable an originating application executing on an operating system of a computing device in the process plant to launch the desired application in connection with the at least one component via an API of an application launcher, wherein the application launcher is configured to launch the desired application with the at least one startup parameter via the API of the desired application and the application launcher is configured to launch a plurality of applications via a plurality of respective APIs, the plurality of applications including the desired application and the plurality of respective APIs including the API of the desired application.

40. A tangible medium storing machine readable instructions, comprising:

first software to receive, via an originating application executing on an operating system of a computing device in a process plant, a user command to launch a desired application;

second software to determine, based on the user command, an indication of the desired application;

third software to retrieve, based on the indication of the desired application, at least one startup parameter to be provided to an application program interface (API) of the desired application; and fourth software to launch the desired application via an application program interface of an application launcher, wherein the application launcher is configured to launch the desired application with the at least one startup parameter via the API of the desired application and the application launcher is configured to launch a plurality of applications via a plurality of respective APIs, the plurality of applications including the desired application and the plurality of respective APIs including the API of the desired application;

wherein the fourth software provides the indication of the desired application to the application launcher via the API of the application launcher;

wherein the API of the application launcher is different than the API of the desired program;

wherein the application launcher retrieves the at least one startup parameter to be provided to the desired application via the API of the desired application;

wherein the application launcher launches the desired application via the API of the desired application with the at least one startup parameter.

* * * * *

UNITED STATES PATENT AND TRADEMARK OFFICE
CERTIFICATE OF CORRECTION

Page 1 of 3

PATENT NO.       : 7,600,234 B2
APPLICATION NO.  : 10/315857
DATED            : October 6, 2009
INVENTOR(S)      : Patrick M. Dobrowski et al.

It is certified that error appears in the above-identified patent and that said Letters Patent is hereby corrected as shown below:

<u>In the Drawings:</u>
Delete sheet 7, and Replace with sheet 7 (attached).
Delete sheet 9, and Replace with sheet 9 (attached).

<u>In the Specification:</u>
At Column 3, line 15, "applications," should be -- applications --.

Signed and Sealed this
Twenty-second Day of February, 2011

David J. Kappos
*Director of the United States Patent and Trademark Office*